United States Patent
Dang et al.

(10) Patent No.: US 10,929,597 B2
(45) Date of Patent: Feb. 23, 2021

(54) TECHNIQUES AND SYSTEMS FOR STORING AND PROTECTING SIGNATURES AND IMAGES IN ELECTRONIC DOCUMENTS

(71) Applicant: ADOBE INC., San Jose, CA (US)

(72) Inventors: Nikhil Dang, New Delhi (IN); Ankit Mathur, Noida (IN); Abhijit Sarkar, New Delhi (IN)

(73) Assignee: ADOBE INC., San Jose, CA (US)

( * ) Notice: Subject to any disclaimer, the term of this patent is extended or adjusted under 35 U.S.C. 154(b) by 123 days.

(21) Appl. No.: 15/460,102

(22) Filed: Mar. 15, 2017

(65) Prior Publication Data

US 2018/0267946 A1 Sep. 20, 2018

(51) Int. Cl.
*G06F 40/174* (2020.01)
*G06F 21/64* (2013.01)
*G06T 1/00* (2006.01)

(52) U.S. Cl.
CPC ............ *G06F 40/174* (2020.01); *G06F 21/64* (2013.01); *G06T 1/0021* (2013.01)

(58) Field of Classification Search
CPC ........ G06F 17/24; G06F 17/25; G06F 40/174; G06F 21/64; G06T 11/60; G06T 1/0021; A63F 2300/5553; A63F 2300/6623
USPC .................................. 715/201, 202, 230, 255
See application file for complete search history.

(56) References Cited

U.S. PATENT DOCUMENTS

| | | | | |
|---|---|---|---|---|
| 2007/0022293 A1* | 1/2007 | Hayashi | ................ | H04L 9/3242 713/176 |
| 2007/0192609 A1* | 8/2007 | Yoshioka | ............... | G06F 21/645 713/176 |
| 2012/0114244 A1* | 5/2012 | Fujiwara | .............. | G06K 9/2081 382/186 |
| 2013/0139045 A1* | 5/2013 | Inoue | .................... | G06F 40/174 715/224 |
| 2014/0019855 A1* | 1/2014 | Kim | ....................... | G06Q 10/10 715/268 |

\* cited by examiner

*Primary Examiner* — Kavita Stanley
*Assistant Examiner* — Jenq-Kang Chu
(74) *Attorney, Agent, or Firm* — F. Chau & Associates, LLC

(57) ABSTRACT

Systems and techniques for storing an electronic document signed during an electronic document signing process. A computing device receives an electronic document that includes content within a content area, an image field positioned on the content area, and a cross sign field positioned partially on the image field and partially on the content area. The computing device receives an image to populate the image field and a signature to populate the cross sign field. The computing devices creates a first signature portion and a second signature portion by splitting the signature. The image is modified with the first signature portion and the content area is modified with the second signature portion. The computing device stores the electronic document by storing a file having separate elements, the separate elements including the modified content area and the modified image, without including the complete signature, unaltered content area, or unaltered image.

19 Claims, 14 Drawing Sheets

Sample Job Application form
Instructions: Print clearly in black or blue ink. Answer all questions. Sign and date the form.
Personal Information
First Name _____
Middle Name _____
Last Name _____

Street Address

_____

City, State, Zip Code

_____

Phone Number

_____

Are you eligible to work in the united states
Yes_____No_____
If you are under age 13, do you have an employment age certificate?
Yes_____No_____
xxxxxxxxxxxxxxxxxxxxxxxxxxxxxxxxxxx
Yes_____No_____
If yes, please explain:_____
_____
Position Availability:
Position applied for — 301 (Paste your cross signed recent color photograph Size: 2"X2")

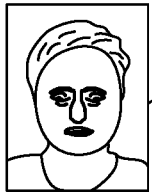
— 302

```
┌─────────────────────────────────────────┐
│ Receive an electronic document having   │
│ content within a content area, an image │
│ field on the content area, and a cross  │──1001
│ sign field partially on the image field │
│ and partially on a portion of the       │
│ content area outside of the image field │
└─────────────────────────────────────────┘
                    │
                    ▼
┌─────────────────────────────────────────┐──1002
│ Receive an image to populate the image  │
│ field and a signature to populate the   │
│ cross sign field                        │
└─────────────────────────────────────────┘
                    │
                    ▼
┌─────────────────────────────────────────┐──1003
│ Create a first signature portion and a  │
│ second signature portion by splitting   │
│ the signature                           │
└─────────────────────────────────────────┘
                    │
                    ▼
┌─────────────────────────────────────────┐──1004
│ Create a modified image by modifying    │
│ the image to include the first          │
│ signature portion                       │
└─────────────────────────────────────────┘
                    │
                    ▼
┌─────────────────────────────────────────┐──1005
│ Create a modified content area by       │
│ modifying the content area to include   │
│ the second portion                      │
└─────────────────────────────────────────┘
                    │
                    ▼
┌─────────────────────────────────────────┐──1006
│ Store the electronic document by        │
│ storing a file of separate elements,    │
│ the separate elements include the       │
│ modified content area, the modified     │
│ image, and searchable text elements of  │
│ the electronic document                 │
└─────────────────────────────────────────┘
```

TECHNIQUES AND SYSTEMS FOR STORING AND PROTECTING SIGNATURES AND IMAGES IN ELECTRONIC DOCUMENTS

TECHNICAL FIELD

This disclosure relates generally to systems and techniques that facilitate the signing and storing of electronic documents.

BACKGROUND

Electronic document signature services facilitate electronic document signing processes. For example, an individual in Atlanta, Ga. can create an electronic document and use an electronic document signature service to send the electronic document to an individual in San Jose, Calif. for signature. The individual in San Jose receives the electronic document and uses the electronic document signature service to complete and/or sign the document, for example, by adding text for the fields of the electronic document and an electronic signature.

Existing signature systems expose elements of a signed electronic document to being retrieved and reused for inappropriate and undesirable purposes. For example, electronic documents are commonly stored as PDFs by existing signature systems. The PDFs include separable elements, including the original electronic documents, text for the fields of the electronic documents, images that are added as separate pages in the PDFs, and signatures. Existing systems maintain the elements of the electronic documents as separate elements in the PDFs rather than flattening the PDFs into single images. This separation is maintained to preserve the ability to search for the text of the fields of the electronic document. However, as a result, the elements of the PDFs are exposed to being individually extracted and used for fraudulent or other improper purposes. An image of a person's face or the person's signature could be extracted and reused on another document. Existing systems cannot adequately protect against such extraction and reuse without flattening the text and potentially impeding the searchability of the text in the electronic documents.

SUMMARY

Systems and techniques are disclosed herein that facilitate storing an electronic document signed during an electronic document signing process. In one embodiment of the invention, a computing device receives an electronic document to be signed in the electronic document signing process. The electronic document includes content within a content area, an image field positioned on the content area, and a cross sign field positioned partially on the image field and partially on a portion of the content area outside of the image field. The computing device receives an image to populate the image field and a signature to populate the cross sign field, for example, from a signer completing and signing the electronic document. The computing devices creates a first signature portion and a second signature portion by splitting the signature. The image is modified with the first signature portion and the content area is modified with the second signature portion. There can be two or more signature portions, determined by the intersection(s) of the signature with the image, that are used to modify the image and/or content area. The computing device stores the electronic document by storing a file with separate elements that include the modified content area, the modified image, and/or search text elements of the electronic document. The complete signature, unaltered image, and unaltered content area are not stored in the file, in this example, to avoid exposing those elements to improper retrieval and use.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 is a block diagram depicting a user interface in which an image is separately attached to an electronic document during an electronic document signing process.

FIG. 3 is a block diagram depicting an image appearing on a separate page from the content area of an electronic document after being separately attached using the user interface of FIG. 2.

FIG. 6 is a block diagram depicting a user interface for authoring an electronic document for cross signing during an electronic document signing process.

FIG. 7 is a block diagram depicting the user interface of FIG. 6 in which an inline image field is positioned within the content area of the electronic document.

FIG. 8 is a block diagram depicting the user interface of FIG. 7 in which a cross sign field is positioned partially over the inline image field within the content area of the electronic document.

FIG. 9 is a block diagram depicting the user interface of FIG. 6 in which a combined image and cross-sign field is positioned within the content area of the electronic document.

FIG. 10 is a flow chart illustrating an exemplary technique for storing and protecting an image and a signature in electronic document.

FIG. 11 is a block diagram depicting a user interface for providing an image and signature to cross sign an electronic document during an electronic document signing process.

FIG. 12 is a block diagram depicting the user interface of FIG. 11 in which an image is received and displayed in the content area of the electronic document.

DETAILED DESCRIPTION

Figure 1:
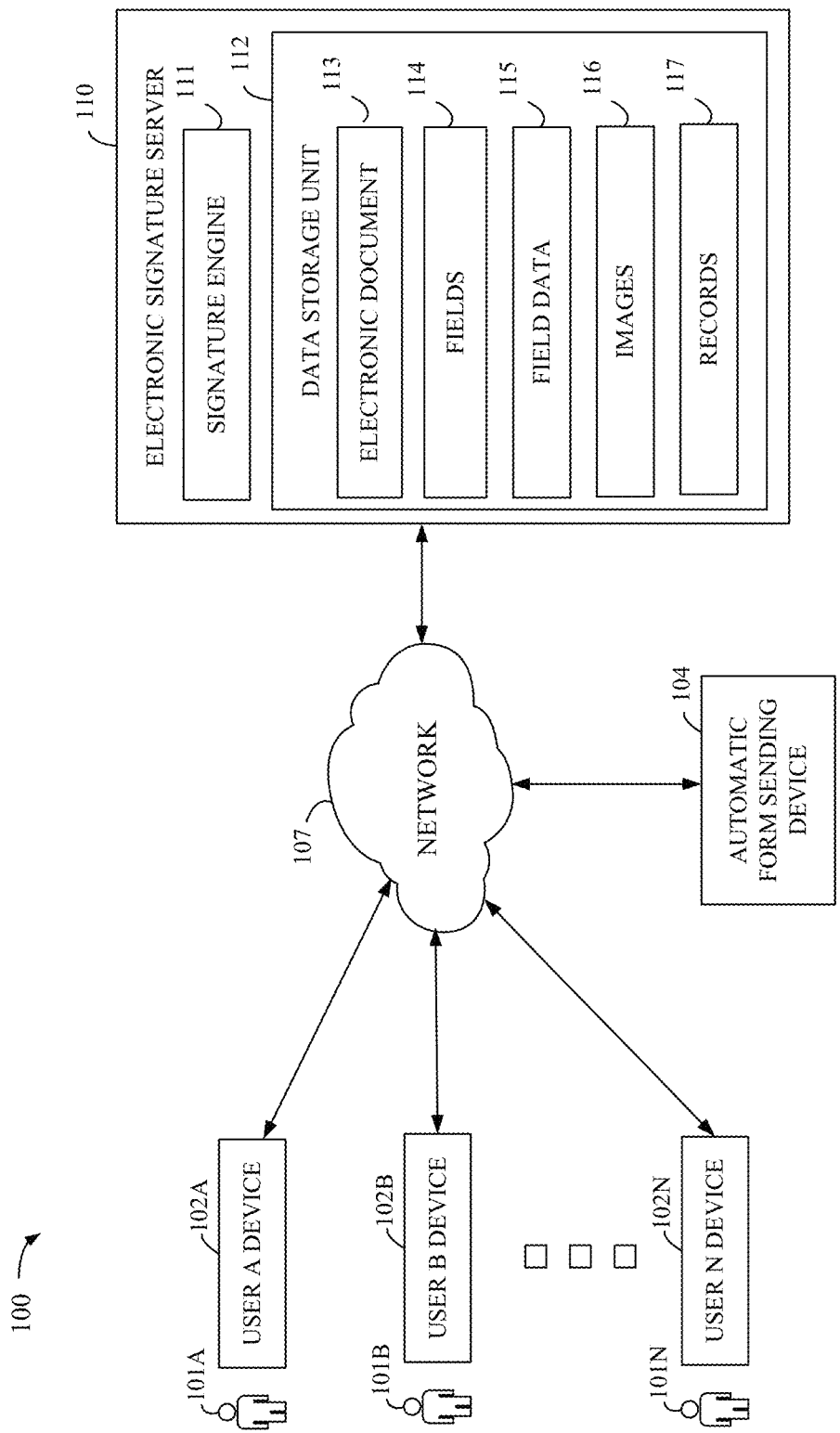
FIG. 1 is a diagram of an environment in which one or more techniques of the invention can be practiced.

As discussed above, existing signature services expose elements of electronic documents to being extracted and reused inappropriately. Techniques disclosed herein address this problem by splitting the signature and embedding a portion of the signature on a content area of the original electronic document and a portion of the signature on another image of the document, such as a photo added by the signer. The electronic document is stored by storing these separate elements, including the modified content area and the modified image rather than storing the unaltered content area, the unaltered image, and/or the complete signature. Using these techniques, the text of the fields of the stored electronic document remain available for search while the image and the signature are altered so that they cannot be extracted and reused. For example, there is no way to extract the complete signature since the two portions of the signature are split and embedded into other objects. Similarly, if someone extracts the image, the image that is extracted will be the modified image including a portion of the signature. In this example, there is no way to extract the signature or the unmodified image.

Techniques of the invention modify elements of an electronic document based on cross-signing of the document. In cross signing, the signer is prompted to provide a signature that will appear over both the original electronic document and an image that is positioned over or adjacent to the electronic document. A portion of the signature, such as the left half, is positioned on the original electronic document and another portion of the signature, such as the right half, is positioned on the image. The signer signs the document by providing a signature, e.g., by identifying an image of his signature or providing a scribble or other input to create a signature, authorizing use of his signature to sign the document, or typing his name for conversion into an image that will be used as the signature. The signature that is provided is split into two or more portions and used to modify both the original electronic document and the image that underlie the signature. The complete signature need not be stored as part of the electronic document. Similarly, the unaltered original electronic document and the unaltered image need not be stored as part of the electronic document. This prevents extraction and reuse of the signature, the unaltered original electronic document, and the unaltered image.

The techniques disclosed herein store the electronic document as separate, searchable elements without flattening the electronic document into a single image. The electronic document includes separate elements such as the original electronic document altered with a portion of the signature, the image altered with another portion of the signature, and searchable text for the fields of the electronic document. In additional to facilitating searching, individually storing these elements can facilitate keeping track of the events that occur during the signing process. For example, if multiple signers will sign an electronic document, the text provided by the individual signers can remain separate and associated with the respective individual signers who provided the text.

The techniques disclosed herein additionally or alternatively provide fields that a sender positions within an electronic document. These fields are configured and positioned to allow a signer to cross sign the document. Specifically, an image field is positioned within the content area of the electronic document. For example, an image field can be added in the upper right hand corner of a page of the document or in any other location and size on the page. This allows an image to be included in a position that is contiguous with other portions of the content area. Because the image can be positioned contiguous with other portions of the content area, a signature can be positioned partially on the image and partially on an adjacent portion of the content area.

A cross sign field is also used. A cross sign field is a signature field that must be positioned partially on an image field and partially on a portion of the content area outside of the image field. The image field and cross sign field are thus used together to enable cross signing. For example, a sender may add an image field and a cross sign field to an electronic document and then send the document for signature by a signer. The signer provides an image and a signature which populate the image field and cross sign field. Because of the positioning of the image field and the cross sign field that partially overlaps it, the result is a signed electronic document with a signature positioned partially on the image and partially on a portion of the electronic document outside the image. The sender can position, size, and/or rotate the cross sign field in a desired location relative to the image field to achieve a particular cross sign appearance. This gives the sender control over the appearance of the cross-signed signature that was not possible in paper-based or electronic signature processes.

The image field and cross sign field can be positioned individually or by positioning a combined field. For example, a unified cross signable-image-field can combine both an image field and a cross sign field that partially overlaps it. In one example, the sender positions the combined field in the content area of an electronic document. The sender then selects a relative position for the cross sign field (e.g., left edge top, bottom edge middle, etc.) that identifies the relative position of the cross sign field to the image field. This technique allows the sender to specify cross signing using only a single field rather than having to separately specify positions for an image field and a cross sign field.

Techniques of the invention support cross signing in electronic signature processes based on user input and/or application programming interface (API) calls. In the first case, a sender can provide input on a user interface to specify positions for an image field and cross sign field and select a command to send the document for signature. In the second case, a computing device runs a process to make API calls to automatically author and send electronic documents for cross signing. The API calls identify the electronic document, the positions of the image field and cross sign field, and the signer identity, and initiate sending of the electronic documents to the signer for signature. API-based implementations can be particularly useful in circumstances in which a business, organization, or government entity is sending electronic documents to many signers to cross sign. The API-based implementations are also useful when a signature workflow is part of a larger workflow. Through the use of an API, information extracted from a previous step of a business process can be used to author and send the document automatically.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "electronic document" refers to any electronic media content that represents information using text, images, or other items that can be displayed on a display of a computing device. Electronic documents can be stored as one or more files on a computer-readable medium. Examples of electronic documents include, but are not limited to, word processing files that are created by entering text, images, and other items onto one or more pages, images of hand-written papers that are created by scanning the hand written papers, contracts, agreements, and other representations of content that are signed by one or more parties for execution, verification, authorization, and any other purposes.

As used herein, the phrase "electronic document signing process" refers to a process that involves the authoring, sending, completing, singing, and/or storing of a signed electronic document. In one example, an electronic document signing process involves a sender authoring an electronic document by identifying a source electronic document and adding fields to be completed by a signer and sending the electronic document for signature by one or more signers. The exemplary process further involves the one or more signers completing the fields and/or signing the electronic document. The exemplary process further involves storing the electronic document for later retrieval and use. An electronic document signing process can be facilitated by an electronic document signature service that provides an interface for the sender to send the document for signature and/or for the one or more signers to sign the electronic document.

As used herein, the phrase "signature" refers to a depiction of a name or other mark that a person adds to an electronic document as proof of the person's identity and intent or as proof of the identity and intent of another person or entity on behalf of whom the person is signing. For example, a person may sign an electronic document to execute the document, form a contract, verify the accuracy or truthfulness of the document, provide an authorization, and for various other purposes. Signatures can include names, other text, drawings, markings, fingerprints, stamps, and other depictions.

As used herein, the phrase "image" refers to a digital depiction of person, place, or thing. An image can be a photograph or a scan of a document such as a license or other proof. An image can comprise pixels that define the appearance of the image. The pixels (i.e., picture elements) of an image identify the appearance of particular portions of the image, for example, with each pixel identifying that a particular area of the image will have a particular color. Images are commonly captured using cameras or scanners and stored in memory on a computing device using information that defines the colors of the pixels for the image.

As used herein the phrase "separate elements" refers to images, text, and other content that can be individually identified and/or accessed in one or more files that store electronic documents. For example, techniques disclosed herein store an electronic document as a file that includes two or more separate elements rather than flattening the electronic document into a single image. In one example, an electronic document includes separate elements such as an original electronic document altered with a portion of a signature, an image altered with another portion of the signature, and searchable text elements for the fields of the electronic document.

As used herein, the phrase "cross sign" refers to positioning a signature on an electronic document such that the signature is partially on an added image and partially on the content area outside of the image in the content area of the electronic document. For example, an electronic document can have an image field added and a cross sign field added. The cross sign field is added in a position partially on the image field and partially on a portion of the content outside of the image field. The electronic document can be cross signed by populating the image field with an image and populating the cross sign field with a signature. The document is cross signed because the signature appears partially on the image and partially on the portion of the electronic document outside of the image field.

As used herein, the phrase "content area" refers to a page or other defined area in which content of an electronic document is included or displayed. For example, if a single-page document is scanned, the content area of the electronic document is a representation of that page. An image that is positioned "within" the content area is positioned such that the image is positioned contiguous with the content area. This allows objects, such as signatures, to be positioned across borders between the image and the adjacent portions of the content area. A separate image or an image on a separate page is not within the content area. As another example, if a multiple-page electronic document is scanned to form a multi-page electronic document, the content area of the electronic document is the content area of the multiple pages of the electronic document. An image that is positioned within the content area of the electronic document must be positioned within the content area of a page of the electronic document.

As used herein, the phrases "in-line image" and "image within a content area" refer to an image being positioned within the content area of an electronic document such that the image is positioned contiguous with the content area of the electronic document. This allows objects, such as signatures, to be positioned across borders between the image and the adjacent portions of the content area. This also allows an image to be in-context of any supporting text. A separate image or an image on a separate page is not in-line with content in the content area of an electronic document.

Exemplary Computing Environment

FIG. 1 is a diagram of an environment 100 in which one or more embodiments of the present disclosure can be practiced. The environment 100 includes users 101A-N, user devices 102A-N, an automatic form sending device 104, and an electronic signature server 110. Examples of the user devices 102A-N include, but are not limited to, a personal computer (PC), a tablet computer, a desktop computer, a laptop, mobile phone, a tablet, a processing unit, any combination of these devices, or any other suitable device having one or more processors. Each user device 102A-N includes at least one application (e.g., a stand-alone app or a webpage provided by a server on a device in a browser) supported by the electronic signature server 110. For example, electronic signature server 110 may provide a webpage that provides an interface on the user devices 102A-N for authoring, sending and/or signing electronic documents.

The electronic signature server 110 communicates with the user devices 102A-N and the automatic form sending device 104 via network 107. Examples of the network 107 include, but are not limited to, the Internet, a local area network (LAN), a wireless area network, a wired area network, a wide area network, and the like.

The electronic signature server 110 includes a signature engine 111. The signature engine 111 provides an interface on the user devices 102A-N for authoring, sending and/or signing electronic documents. For example, user 101A may use user device 102A to download and use a webpage that provides the interface. The user 101A can use such a webpage to upload an electronic document to the signature engine 111, identify locations on the document to add fields for information, images, and signatures to be provided by a signer, specify an e-mail address or other identification information of the signer, and initiate sending of the electronic document to the signer. If user 101A identifies user 101B as the signer, the signature engine 111 sends the document for signature to user 101B, for example by sending an e-mail with a link for the signer to access the electronic document for signature. An electronic document can also be provided for signature using a widget that provides a hosted form. For instance, a widget may provide a bank account opening form that is hosted on the bank's website.

User 101B uses user B device 102B to access the electronic document for signature. For example, user 101B may use user device 102B to request a webpage that provides a signing interface from the signature engine 111. The signing interface allows user 101B to preview the electronic document and add images, signatures, dates, and/or other information to populate the fields of the electronic document. The user 101B then submits the signed electronic document. In the case of widgets, the signer visits the hosted form with or without logging into the host site and fills in, signs (cross signs), and submits the form.

During the electronic signature process facilitated by signature engine 111, the signature engine 111 enables cross signing. The signature engine 111 allows fields to be added to electronic documents that facilitate cross signing. In one example, the signature engine 111 provides a user interface to user device 102A that user 101A uses to author and send an electronic document for cross signing. The user interface includes a tool for the user to provide an electronic document. For example, user 101A may provide a scan of an existing form document. The electronic document includes content, such as the scanned content from the paper version of the document, that is displayed for editing in the user interface. The signature engine 111 also includes editing tools that allow user 101A to add fields to an electronic document. These fields include fields that enable cross signing, such as an image field that can be positioned within the electronic document's content area, a cross sign field that can be positioned partially over an image field, and/or a combined field that provides both an image field and a partially-overlapping cross sign field. User 101A interacts with the user interface to author an electronic document that will be sent to the signer. User 101A is able to add the image field at a position within the content area of the electronic document. User 101A is also able to position a cross sign field in a position that is partially over the image field and partially over a portion of the content area outside of the image field. In this example, the electronic document 113 and added fields 114 are stored on the electronic signature server 110 in data storage unit 112. The user 101A sends the electronic document 113 and added fields 114 to a signer, such as user 101B. The events involved in user 101A authoring and sending the electronic document are recorded in records 117.

The signature engine 111 also allows an electronic document to be authored for cross signing through automated processes. In the example of FIG. 1, automated form sending device 104, is configured with a computer program that executes an automated process to author an electronic document with fields for cross signing. The automatic form sending device 104, for example, may be a server that responds to requests for the form by authoring a form with appropriate fields and sending the form to the requester for signature. The automatic form sending device 104 provides or invokes one or more API calls to the signature engine 111, position fields such as an image field and a cross sign field, and send the electronic document with fields to a signer, such as user 101B. The events involved in automatic form sending device 104 authoring and sending the electronic document are recorded in records 117.

The signature engine 111 also allows a signer to cross sign an electronic document that is provided to the signer with the appropriate fields for completion. For example, signature engine 111 may provide a user interface to user B device 102B that is used by user 101B. The interface may display the electronic documents with the fields and request input from user 101B to complete the fields. User 101B cross signs the document by uploading an image that is used to populate the image field and a signature that is used to populate the cross sign field. In this way, the signature is provided in a position on the electronic document content area that is partially on the image and partially on a portion of the content area outside of the image. User 101B may additionally provide other images, information, and signatures that are used to populate other fields of the electronic document. The field data 115 and images that are provided are stored on the electronic signature server 110 in the data storage unit. The events involved in user 101B cross signing and otherwise completing the electronic document are recorded in records 117. The completed electronic document includes the electronic document 113, the fields 114, the field data 115, the images 116, and the records 117. These parts can be used to construct the completed electronic document for display, print, or other any other purpose.

Embodiments of the invention provide techniques, systems, and computer-readable mediums with stored instructions that enable cross signing on an image during an electronic document signing process. The functions involved in these embodiments of the invention generally involve authoring an electronic document with fields for cross signing, receiving an image and a signature for cross signing, and cross signing the electronic document using the fields, the image, and the signature. In addition, portions of the signature can be embedded in the content of the electronic document and/or the image. These functions are generally implemented on one or more computing devices that use one or more processors to execute algorithms of one or more operations defined in stored instructions. The computing devices that perform these functions can be located on a user's local computing device, such as on user devices 102A-N, or on a remote computing device, such as on electronic signature server 110 of FIG. 1. The operations of various exemplary algorithms that can be employed to perform these functions are discussed throughout this specification.

Figure 2:
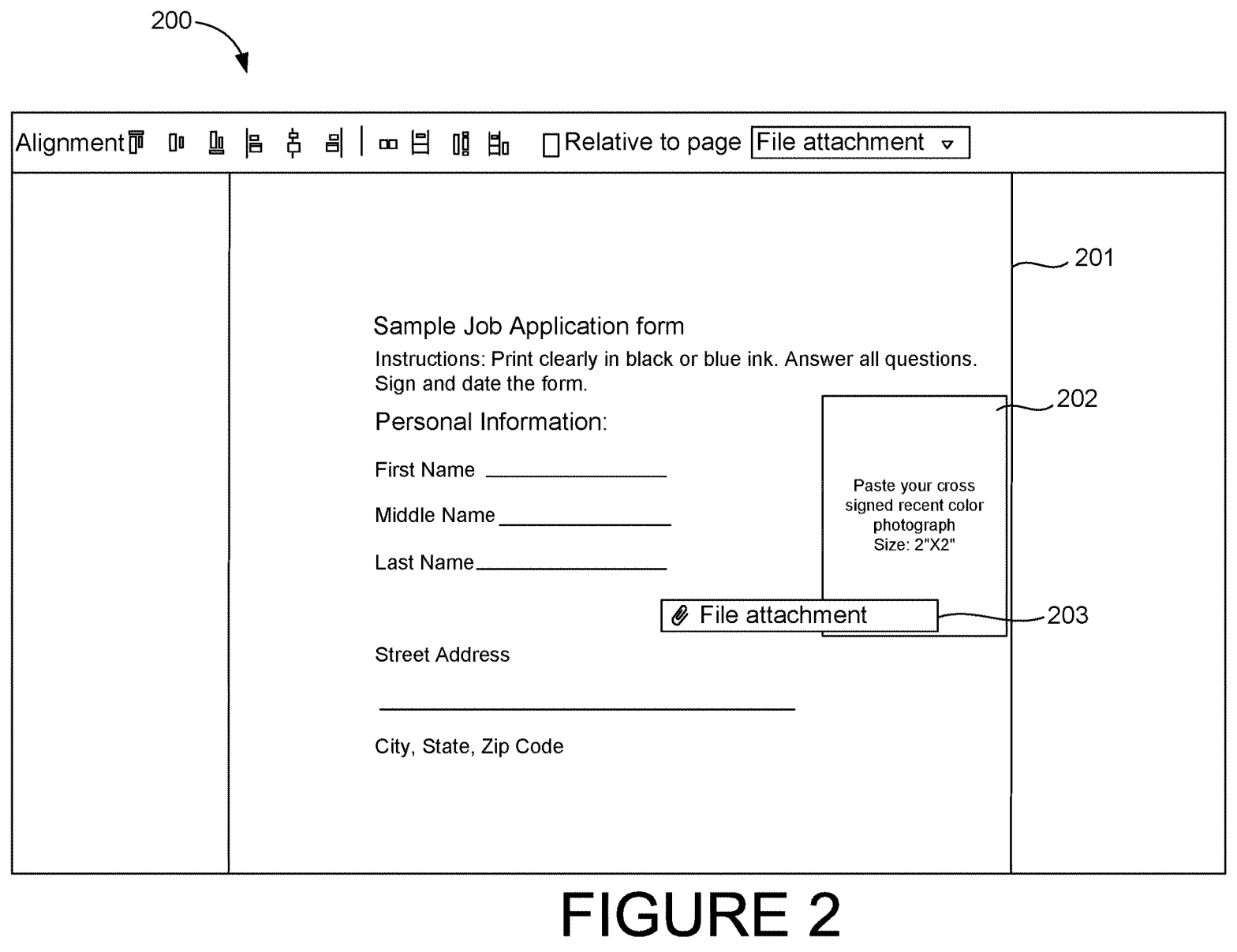

Existing electronic document signature systems do not facilitate cross signing over images on electronic documents. FIGS. 2 and 3 illustrate some of the features of existing signature systems that inhibit the use of cross signing. FIG. 2 is a block diagram depicting a user interface 200 in which an image is separately attached to an electronic document during an electronic document signing process. The user interface 200 displays an electronic document that includes content in content area 201. In this example, this content is a scan of a paper document and includes a graphical depiction of a square with text inside that states "Paste your cross signed recent color photograph. Size 2"×2"." As in certain existing systems, in the user interface 200, the sender who is authoring the electronic document for signing is unable to add an image field that corresponds to the location and size of the square from the paper document. Instead, the sender adds a file attachment link 203. The file attachment link 203 allows a signer to identify an image that will remain separate from content area of the electronic document. FIG. 3 is a block diagram depicting an image 302 appearing on a separate page from the content area 301 of an electronic document after being separately attached using the user interface of FIG. 2. Because the image 302 is separate from the content area 201 of the electronic content there is no way to enable cross signing.

Exemplary Techniques for Cross Signing on an Image

Figure 4:
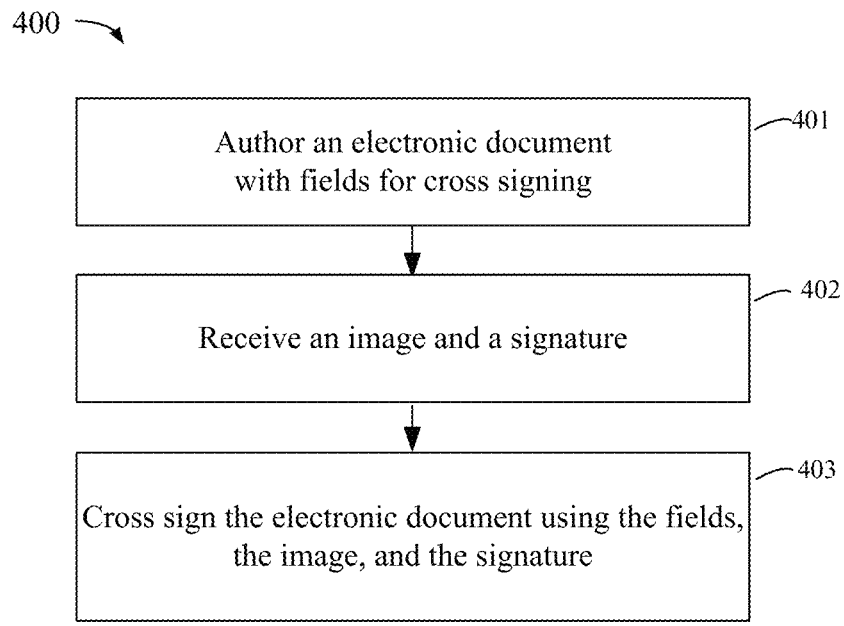
FIG. 4 is a flow chart illustrating an exemplary technique for authoring and cross signing an electronic document during an electronic document signing process.

FIG. 4 is a flow chart illustrating an exemplary technique 400 for authoring and cross signing an electronic document during an electronic document signing process. The exemplary technique 400 can be implemented on local computing devices, such as on user devices 102A-N, or on a remote computing device, such as on electronic signature server 110 of FIG. 1. However, other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices. The technique 400 involves authoring an electronic document with fields for cross signing, as shown in block 401. The technique 400 further involves receiving an image and a signature, as shown in block 402. Additionally, the technique 400 involves cross signing the electronic document using the fields, the image, and the signature, as shown in block 403. After the cross signing, portions of the signature can be embedded in the content of the electronic document and/or the image. Examples of these features are discussed with respect to FIGS. 5-14.

Figure 5:
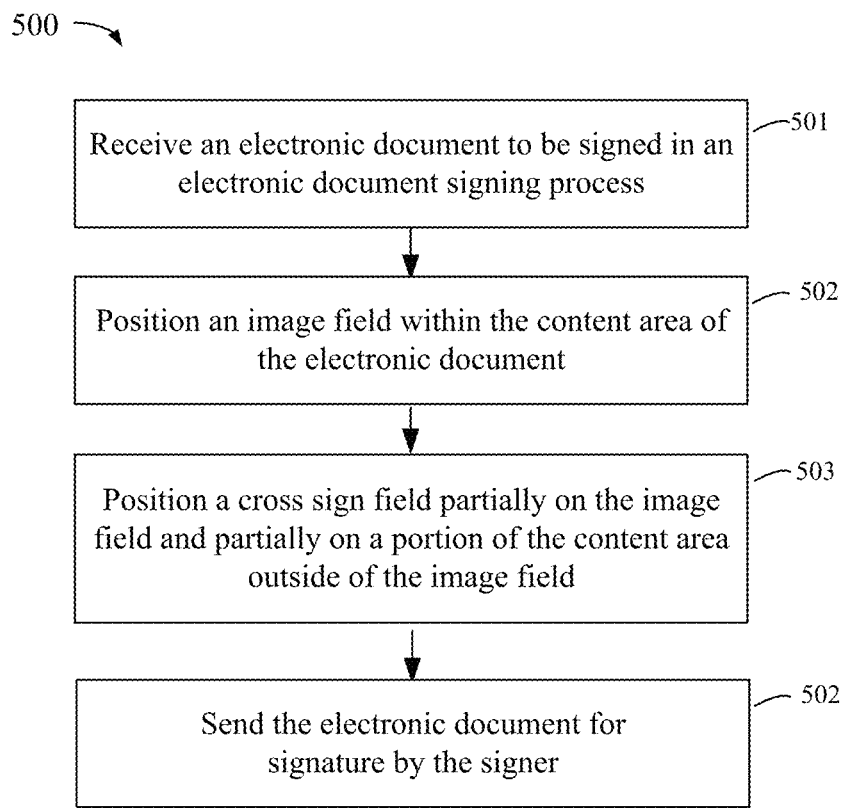
FIG. 5 is a flow chart illustrating an exemplary technique for authoring an electronic document with fields for cross signing during an electronic document signing process.

FIG. 5 is a flow chart illustrating an exemplary technique for authoring an electronic document with fields for cross signing during an electronic document signing process. The exemplary technique 500 can be implemented on local computing devices, such as on user devices 102A-N, or on a remote computing device, such as on electronic signature server 110 of FIG. 1. However, other devices and configurations can also be implemented. The exemplary technique 500 can be implemented by storing and executing instructions in a non-transitory computer-readable medium. Reference to the technique 500 being performed by a computing device includes the technique 500 being performed by one or more computing devices.

The technique 500 involves receiving an electronic document to be signed in an electronic document signing process, as shown in block 501. The document is received by the electronic document signature service that will facilitate the electronic document signing process. The received document can be stored locally on the user's device and/or on a remote server, such as the electronic signature server 110 of FIG. 1, that is facilitating the process. In one example, an electronic document signature service provides a user interface that allows a sender to identify a file storage location from which the electronic document is received. The user interface displays the electronic document once it is received.

Receiving the electronic document, as shown in block 501, can involve directly receiving the electronic document from a scanning process. In one example, the electronic document signature service provides a user interface that allows a sender to scan a document using a scanning device and directly import the scan into the user interface. The user interface can display the electronic document and store a local copy of the electronic document.

Receiving the electronic document, as shown in block 501, can additionally or alternatively involve receiving the electronic document from an automated process. For example, an automated process may use an application programming interface (API) call to identify a location from which the document is to be retrieved for storage and use by an electronic document signature service in an electronic document signing process. As a specific example using the devices of FIG. 1, a process executed by automated form sending device 104 can provide an electronic document that is received by the electronic signature server 110 and stored in the data storage unit 112.

The technique 500 positions an image field within the content area of the electronic document, as shown in block 502. The image field can be positioned based on user input or automatically based on an API call. For example, a sender may drag and drop the image field into a particular position and resize the image field to have a particular shape. The image field is positioned within the content area of the electronic document at the positon where the image will be displayed in the content area rather than separately from content area. Thus, the image is positioned within the content area such that the image is positioned contiguous with portions of the content area. This allows objects, such as signatures, to be positioned across borders between the image and the adjacent portions of the content area. An API call can position an image field by providing one or more coordinates or parameters that specify the location, size, dimensions, shape, etc. of the image field within the content area.

The technique 500 positions a cross sign field partially on the image field and partially on a portion of the content area outside of the image field, as shown in block 503. The cross sign field can be positioned based on user input. For example, a sender may drag and drop the cross sign field into a particular position, resize the cross sign field to have a particular shape, rotate the cross sign field to have a particular rotation, etc. The user interface may restrict the positioning of the cross sign field. For example, the user interface may require that the cross sign field be positioned at least partially on an image field and at least partially on content outside of an image field. Moreover, the user interface may require that at least predetermined amount (e.g., 25%) of the cross sign field be over the image field or outside portion. Similarly, the user interface may require a rotation of the cross sign field of at least a predetermined amount (e.g., 10 degrees from horizontal). The cross sign field can alternatively be automatically positioned based on an API call. An API call can position a cross sign field by providing one or more coordinates or parameters that specify the location, size, rotation, dimensions, shape, etc. of the image field within the content area. In an alternative embodiment, rather than separately positioning an image field and a cross sign field, a single combined field is positioned that provides positions for both an image field and a signature field.

The technique 500 further involves sending the electronic document for signature by the signer, as shown in block 504. In one example, the sender specifies a signer e-mail address in an authoring interface or an API call. When the sender selects a send command on the user interface or provides a API call to initiate sending, the electronic signature service sends the electronic document for signature by the signer. In one example, this involves sending an e-mail with a webpage link to the signer's e-mail address. The web-link retrieves a webpage for display on the signer's computing device and the webpage retrieves and displays the electronic documents and fields for the signer to complete.

FIGS. 6-9 illustrate use of a user interface to author an electronic document for cross signing using various exemplary techniques.

Figure 6:
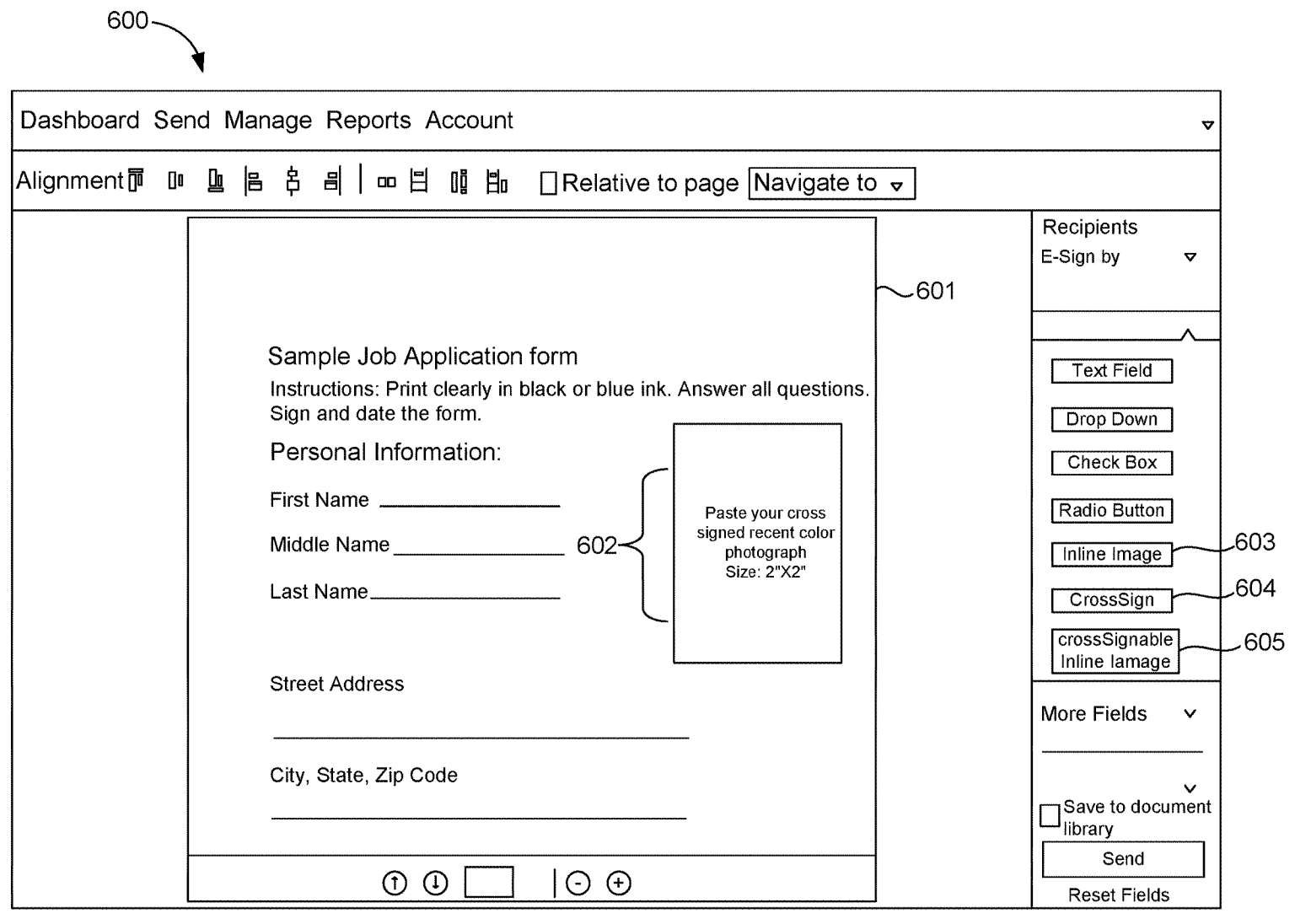

FIG. 6 is a block diagram depicting a user interface 600 for authoring an electronic document for cross signing during an electronic document signing process. In this example, an electronic document has been received and content of the electronic document is being displayed in content area 601. In this example, the content is a scan of a paper document and includes graphical depiction of a square 602 with text inside that states "Paste your cross signed recent color photograph. Size 2"×2"." In other examples, an electronic document is created electronically, for example, using a word processing application. The user interface 600 further includes field tools for adding fields to the electronic document, including an Inline Image field tool 603, a CrossSign field tool 604, and a CrossSignableInlineImage field tool 605.

Figure 7:
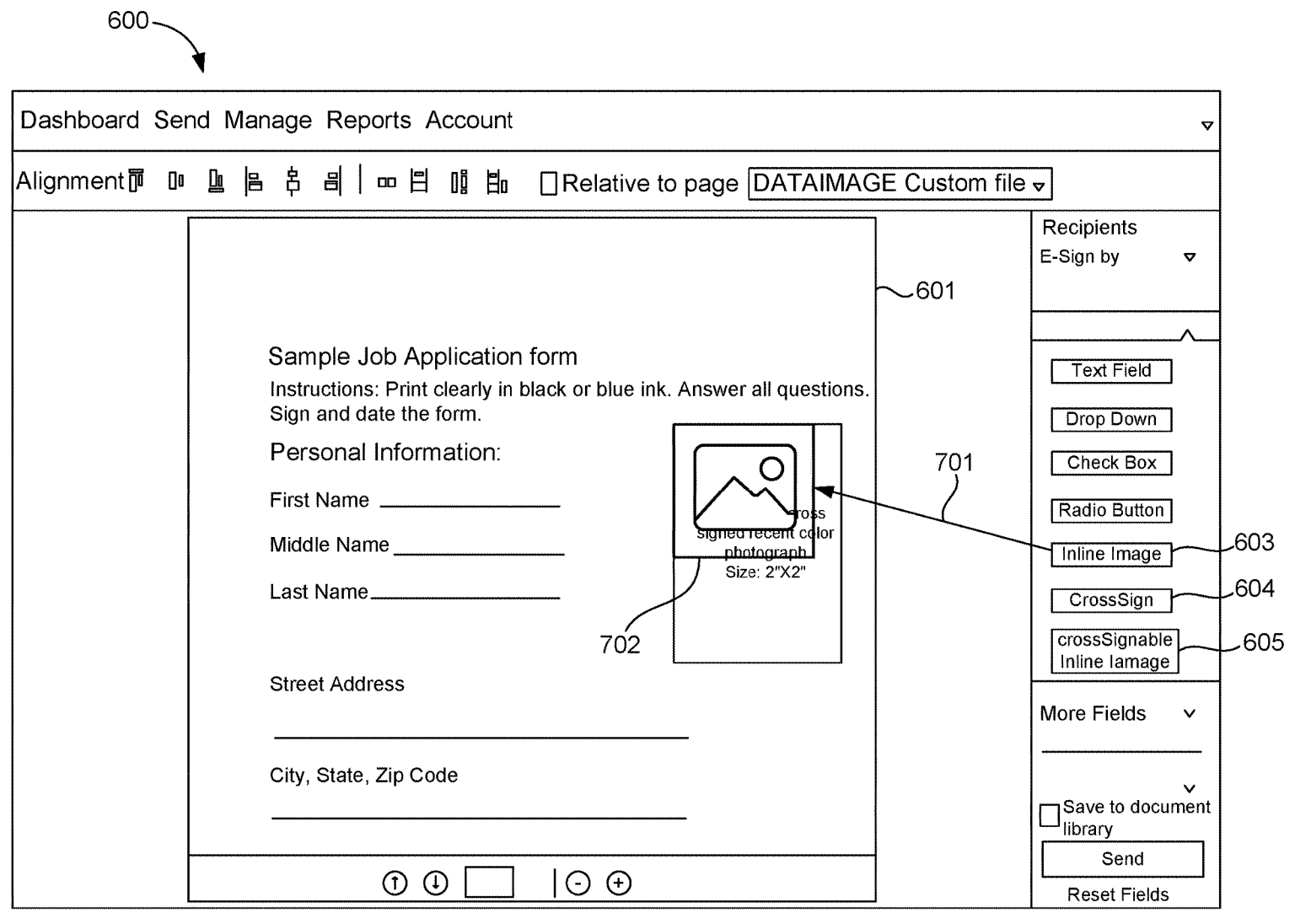

FIG. 7 is a block diagram depicting the user interface 600 of FIG. 6 in which an Inline Image field 702 is positioned within the content area 601 of the electronic document. Specifically, a sender clicks on the Inline Image field tool 603, and drags along path 701 to position the Inline Image field 702 within the content area 601 at a desired location. The sender can then resize the Inline Image field 702 to an appropriate shape and size.

Figure 8:
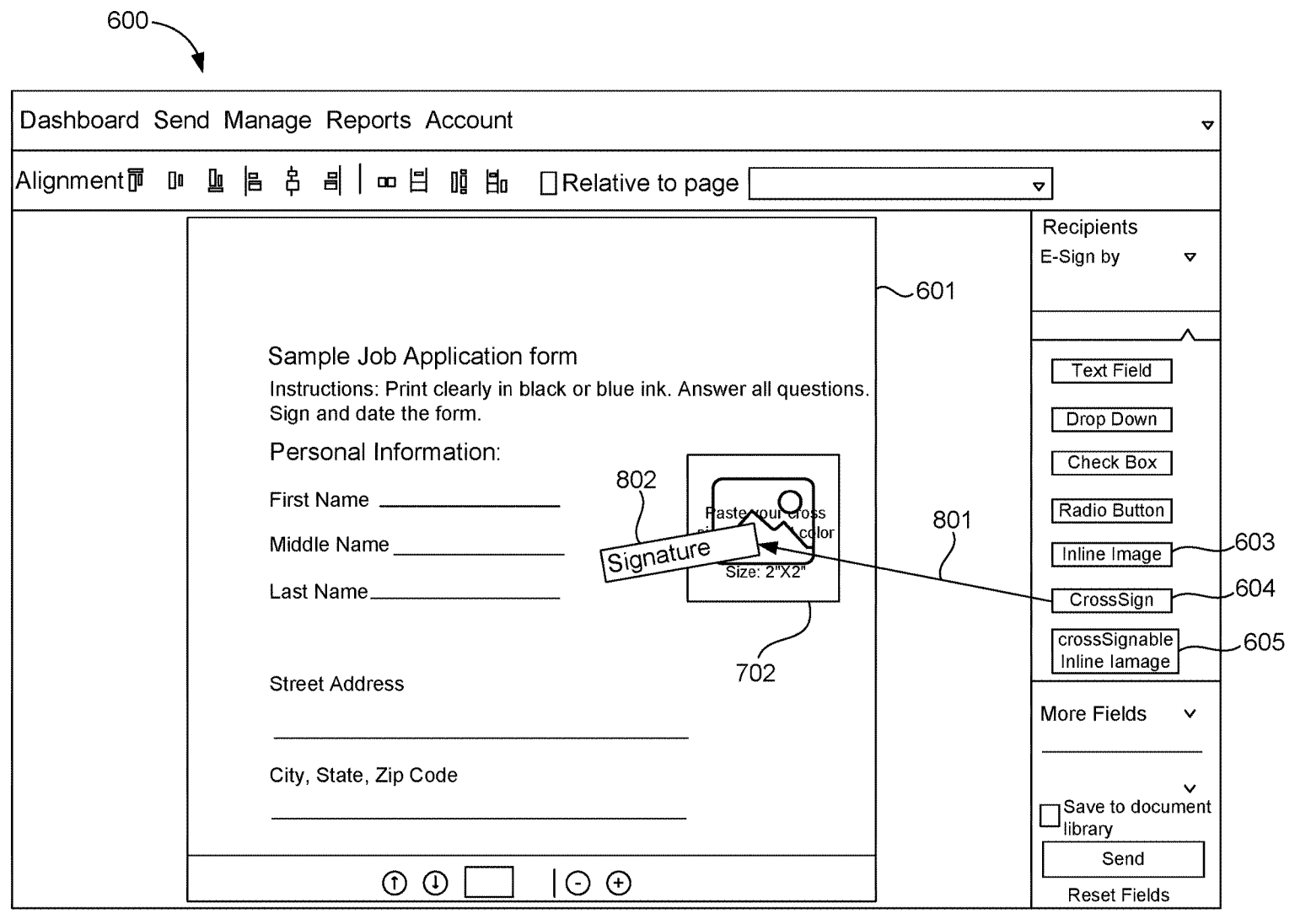

FIG. 8 is a block diagram depicting the user interface of FIG. 7 in which a cross sign field 802 is positioned partially over the Inline Image field 702 within the content area 601 of the electronic document. Specifically, the sender clicks on the CrossSign field tool 604, and drags along path 801 to position the CrossSign field 802 within the content area 601 at a desired location partially over the Inline Image field 702. The sender then rotated and resized the CrossSign field 802 to have a desired shape, size, and rotation.

Figure 9:
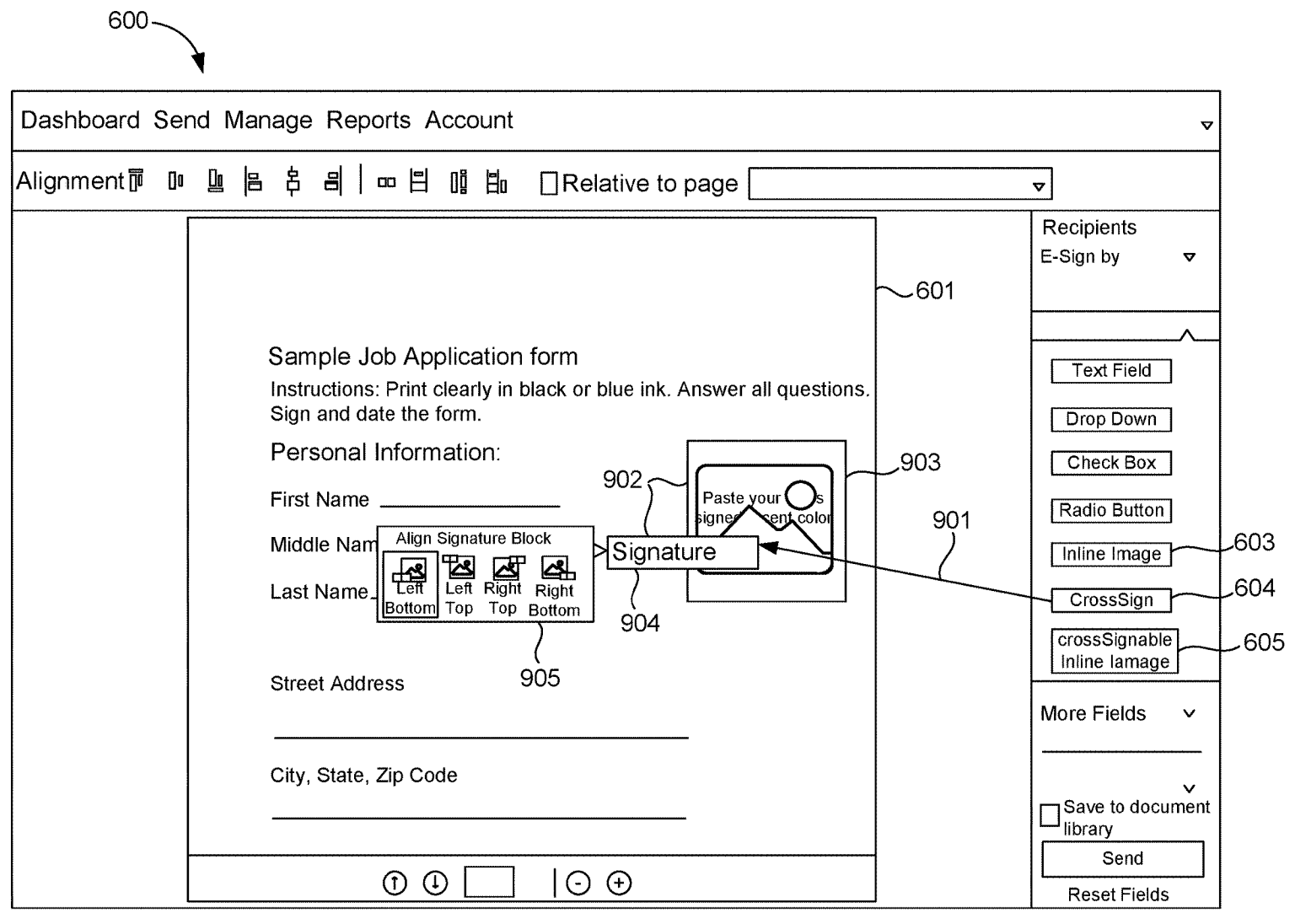

FIG. 9 is a block diagram depicting the user interface of FIG. 6 in which a combined field 902 is positioned within the content area 601 of the electronic document. In this example, the sender positions a single field, the combined field 902 rather than separate fields for the image and signature. Specifically, the sender clicks on the CrossSignable Inline Image field tool 605, and drags along path 901 to position the CrossSignable Inline Image field 902 within the content area 601 at a desired location. The CrossSignable Inline Image field 902 combines an Inline Image field 903 and a CrossSign field 904, but allows the sender to position both of these sub-fields by positioning the combined field 902 using a single drag and drop action. The sender then uses menu 905 to select a predefined position for the CrossSign field 904 to be positioned relative to the Inline Image field 903 in the combined field 902. The menu 905 allows the sender to select the predefined position from a set of predefined positions relative to the image field: left bottom, left top, right top, right bottom. These predefined positions are presented as examples. Additional or alternative predefined positions, sizes, and rotations can be used.

Any of the positioning, sizing, rotating, and other selections illustrated in FIGS. 6-9 as being based on user input can alternatively be specified by an automatic process that uses one or more API calls. The parameters of the API calls can specify the positions, sizes, rotations, selections, etc. without requiring a user interface and/or user input.

FIG. 10 is a flow chart illustrating an exemplary technique 1000 for cross signing an electronic document based on an image and signature received from a signer during an electronic document signing process. The exemplary technique 1000 can be implemented on local computing devices, such as on user devices 102A-N, or on a remote computing device, such as on electronic signature server 110 of FIG. 1. However, other devices and configurations can also be implemented. The exemplary technique 1000 can be implemented by storing and executing instructions in a non-transitory computer-readable medium. Reference to the technique 1000 being performed by a computing device includes the technique 1000 being performed by one or more computing devices.

The technique 1000 involves receiving an electronic document as shown in block 1001. The electronic document has content within a content area, an image field positioned on the content area, and a cross sign field positioned partially on the image field and partially on a portion of the content area outside of the image field. In one example, the electronic document is received by a signature service from a sender in a document signing process in which the sender is using the signature service to send electronic document to be signed by a signer. In this example, the signature service initially stores the electronic document as a file that includes separate elements for the content area, e.g., an image of the content area, and/or one or more fields (e.g., image field, cross sign field, text field, etc.). The fields are configured to receive and be populated by certain types of content. An image field is populated with an image, a text field is populated with text, etc.

Technique 1000 involves receiving an image to populate the image field and a signature to populate the cross sign field, as shown in block 1002. In one example, the image and signature are received by the electronic document signature service that will facilitate the electronic document signing process based on input received from the signer of the electronic document. The unaltered image and complete signature are temporarily stored locally on the user's device and/or on a remote server, such as the electronic signature server 110 of FIG. 1, that is facilitating the signature process. In one example, an electronic document signature service provides a user interface that allows a signer to identify a file storage location from which the image is received. Receiving the image can involve directly receiving the image from a scanning process. In one example, the electronic document signature service provides a user interface that allows a user to capture a new photograph or scan an existing photograph, proof, or other item using a scanning device and directly import the image into the user interface. The user interface can display the image.

A variety of techniques can be used to receive a signature. In one example, a signature is automatically generated based on the letters in the signer's name or any other appropriate text and the signer confirms the signature. The signer may alternatively select from a set of signatures that show the signer's name or other text in a variety of fonts, including fonts that mimic handwriting. A signature can be received based on a movement of a finger or stylus on a touch screen, using a specialized signature device, or using other equipment that receives input from the signer to identify a shape of the signer's signature. A signature can be stored in a file that a signer uses to sign electronic documents. For example, a signer can provide the signature by identifying the file storage location at which the stored signature can be found. A signature can be created from a signed paper document or by doing an image capture of a signature. For example, the content of a portion of scanned paper document can be analyzed to differentiate the signature stroke from the background of the document and the stroke portion stored as the signature. In another example, a fingerprint is used as signature. In another example, a Hanko stamp is used as a signature.

Technique 1000 further involves creating a first signature portion and a second portion by splitting the signature, as shown in block 1003. This can involve splitting the signature by determining a first signature portion and a second signature portion based on an intersection of a border of the image with the signature. The first signature portion that is on the inside of the image border is selected to be included in the image. The second signature portion that is on the outside of the image border is selected to be included in the content of the electronic document.

Technique 1000 further involves creating a modified image by modifying the image to include the first signature portion, as shown in block 1004. In one example, creating the modified image involves replacing pixel values to replace image content with the first signature portion. For example, this can involve identifying coordinates (e.g., x/y coordinates) of the stroke (e.g., where the "ink" is as opposed to the background) of the first signature portion, identifying a location where the first signature portion will appear on the image based on the relative positions of the cross sign field and image field to one another, and then determining locations of pixels of the image to replace with pixels of the stroke of the signature based on the stroke coordinates and location of the first signature portion. In this example, the stroke of the first signature portion is integrated on the background of the image. The stroke forming the letters of the signature appear on the background of the image. For example, the stroke forming the letters of the signature may appear over a sky displayed in the image and/or over the face of a person displayed in the image. The replaced pixels of the image prior to the modification (i.e., of the unaltered image) can be discarded so that the unaltered image is no longer available. Only the modified image that includes the first signature portion is retained for storage.

The technique 1000 further involves creating a modified content area by modifying the content area of the electronic document to include the second signature portion, as shown in block 1005. In one example, creating the modified content area involves replacing pixel values, text objects, links, and/or other content of the content area with pixels of the second signature portion. For example, this can involve identifying coordinates (e.g., x/y coordinates) of the stroke (e.g., where the "ink" is as opposed to the background) of the second signature portion, identifying a location where the second signature portion will appear on the content area based on the positioning of the cross sign field relative to the content area, and then determining locations of content of the content area to replace with pixels of the stroke of the signature based on the stroke coordinates and location of the second signature portion. In this example, the stroke of the second signature portion is integrated on the content area. The stroke forming the letters of the signature appear surrounded by content of the content area. For example, the stroke forming the letters of the signature may appear over a blue-colored background of the content area. The replaced content of the content area (i.e., of the unaltered content area) can be discarded so that the unaltered content area is no longer available. Only the modified content area that includes the second signature portion is retained for storage.

These modifications to the image and/or content area make it difficult to separate the signature from the modified image and modified content area. The modifications and/or discarding of the unaltered image, unaltered content area, and/or complete image may protect against tampering, fraud, and accidental alteration, for example, making it more difficult to extract and use the complete signature, the unaltered image, and/or the unaltered content area of the original electronic document.

The technique 1000 stores the electronic document by storing a file of separate elements, as shown in block 1006. The separate elements include the modified content area, the modified image, and searchable text elements of the electronic document. By separating these elements in the stored electronic document the electronic document can be searched for particular text values. For example, a text element of the electronic document may include the signer's social security number. A collection of electronic documents can be searched to identify all documents that include that particular search elements and the search results identified more quickly and efficiently based on the electronic documents storing separately elements that include searchable text elements. For example, the search can be conducted more quickly, efficiently, and accurately than if the electronic document had been flattened into a single image document. In addition, because the electronic document stored the modified image and modified content rather than the unaltered image, unaltered content area, and complete signature, these elements are not exposed to being extracted and used for improper purposes. In one example, since the complete signature is not stored (and is discarded), it is very difficult if not impossible for a user to recreate the complete signature from the stored elements of the electronic document. Similarly, in another example, since the image is modified (and the unmodified image is discarded), it is very difficult, if not impossible, for a user to recreate the unaltered image from the stored elements of the electronic document.

While the example of FIG. 10 illustrates splitting a signature into two portions, a signature can be split into any number of portions. For example, a signature field may be positioned so that the signature starts on the document crosses over the image and continues on another side of the image. In this example, the signature can be broken into three portions: a first portion of the signature on one side of the image, a second portion of the signature that is on the image, and a third portion that is on the other side of the image. The content area of the electronic document can be modified to include the first and third portions of the signature and the image can be modified to include the second portion of the signature. In another example, two images are inserted into an electronic document and a signature overlaps the content area of the electronic document and each of the two images. The signature in this example can be split into three portions: one portion for the content area of the electronic document, a second portion for the first image, and a third portion for the second image. The content area, first image, and second image are then modified with the respective portion of signature. Numerous other examples involving any combination of the content area, one or more images, and one or more images are possible.

Figure 11:
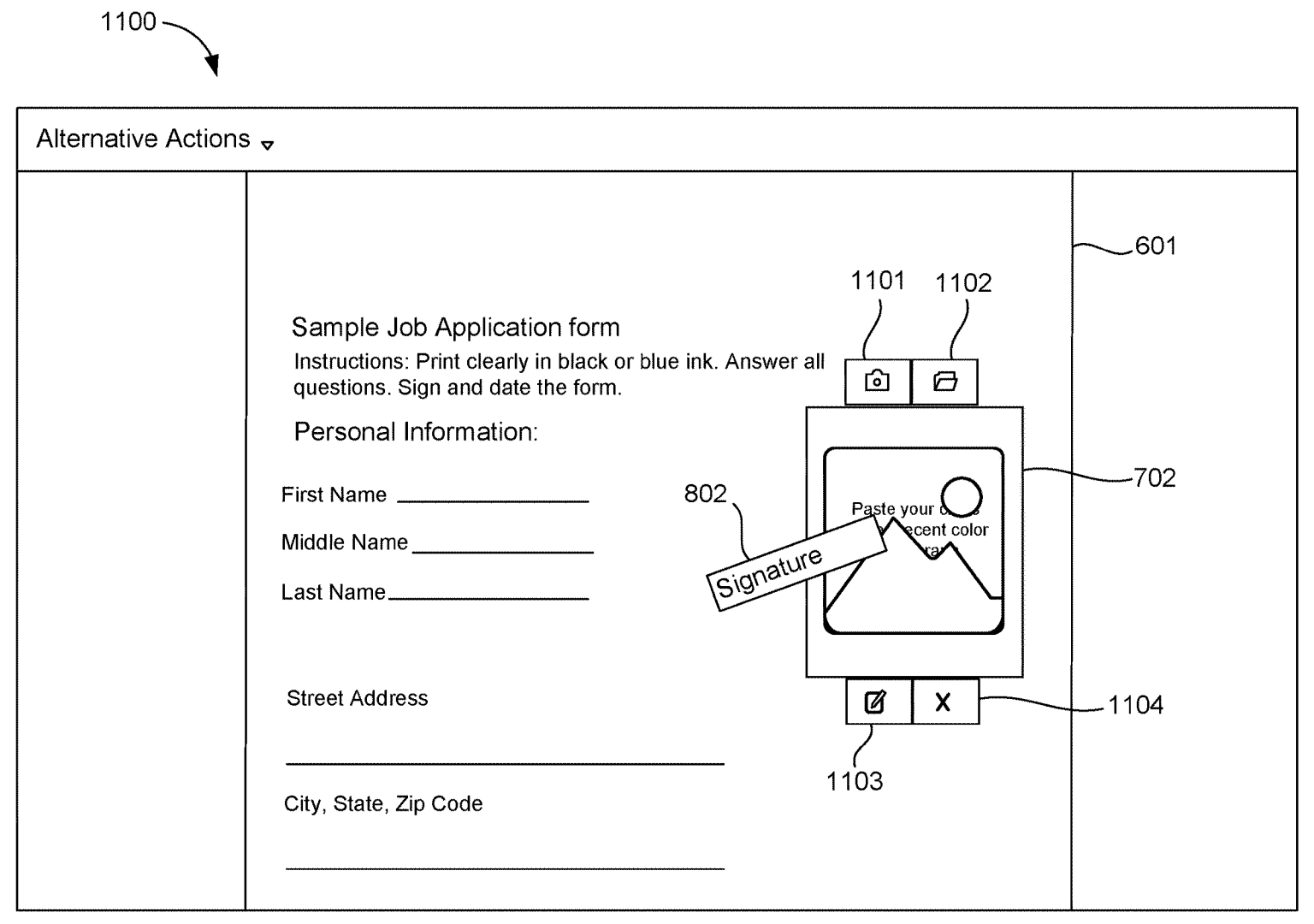

FIG. 11 is a block diagram depicting a user interface 1100 for providing an image and signature to cross sign an electronic document during an electronic document signing process. In this example, the user interface includes an electronic document with a content area 601 to which an image field 702 and a cross sign field 802 have been added.

The user interface 1100 also include image tools 1101-1104 to assist the signer with adding an image to the image field 702. Image tools 1101-1104 are provided during the signature process when the signer is providing the image to populate the image field 702. Camera tool 1101 allows the signer to use a camera on the user's device to capture an image that will be used for the image field 1102. File tool 1102 allows the signer to identify a storage location on the local device or a remote device from which the image is to be retrieved. Editing tool 1103 allows the signer to perform editing functions on an identified image. For example, the signer may zoom, translate, or crop the image or apply a contrast change, filter, red-eye reduction, etc. Exit tool 1104 allows the signer to exit from providing the image, for example, to populate another field or discontinue the signing process. These exemplary image editing tools are provided as examples. Numerous additional or alternative image adding tool can be used.

Figure 12:
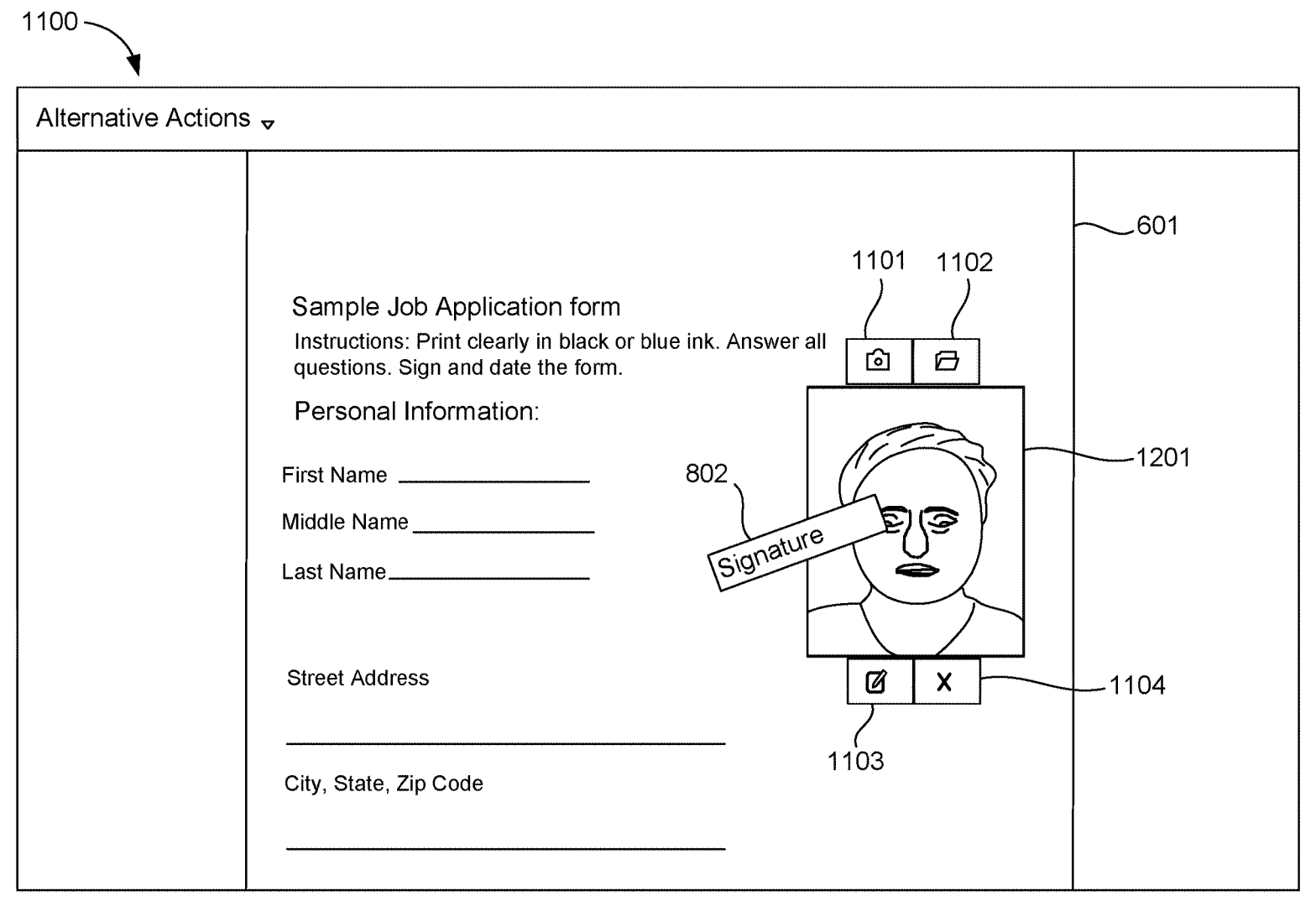

FIG. 12 is a block diagram depicting the user interface of FIG. 11 in which an image 1201 is received and displayed in the content area 601 of the electronic document. The image is displayed contiguous with portions of the content area rather than being on a separate page.

Figure 13:
FIG. 13 is a block diagram depicting the user interface of FIG. 12 in which a signature is received and displayed partially over the image and partially over a portion of the content area of the electronic document.

FIG. 13 is a block diagram depicting the user interface of FIG. 12 in which a signature 1301 is received and displayed partially over the image 1201 and partially over a portion of the content area 601 of the electronic document outside of the image 1201. In this way, the signer has cross signed the electronic document and is able to view his or her signature positioned partially on the image 1201 and partially on a portion of the content area 601 outside of the image 1201.

Figure 14:
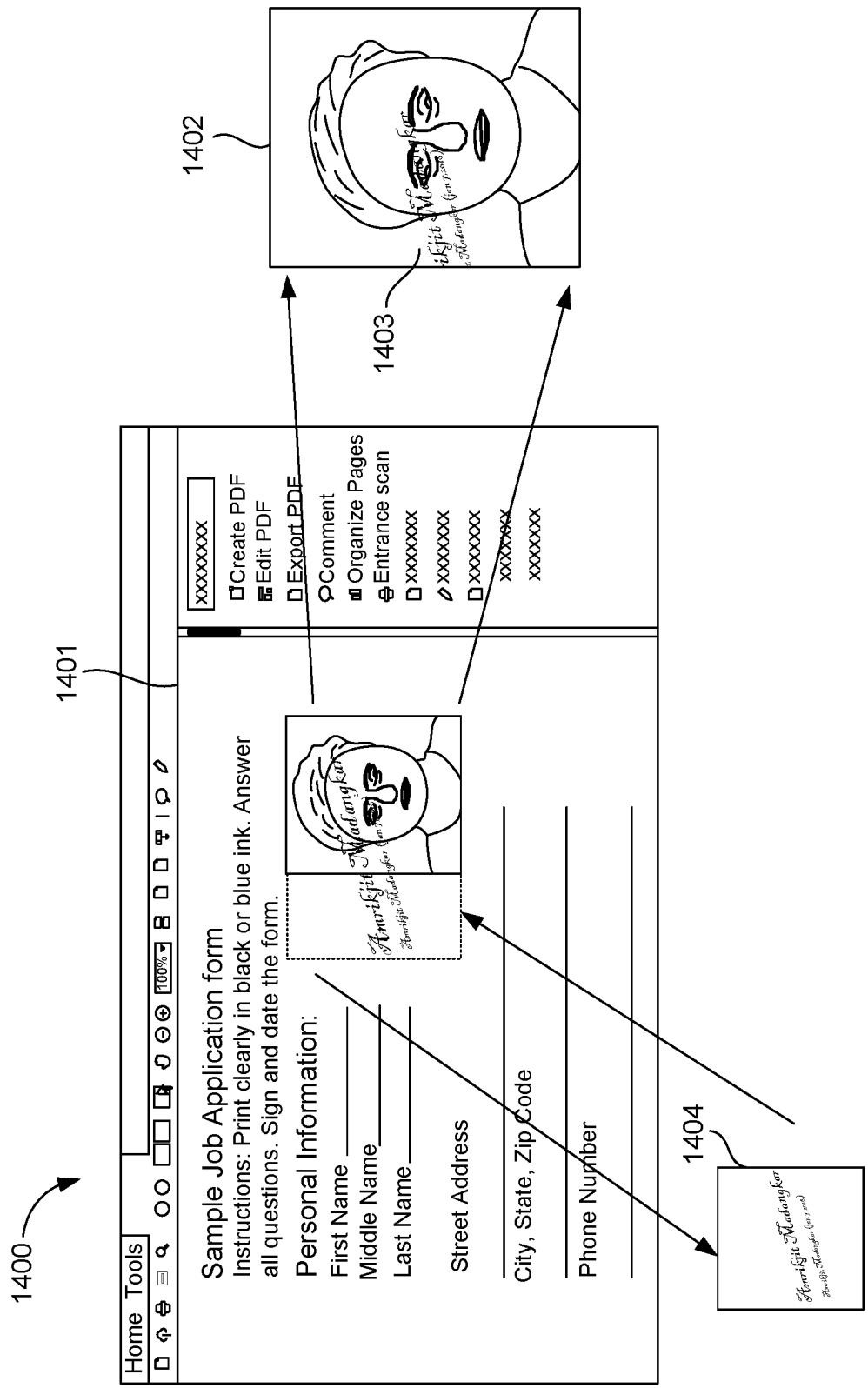
FIG. 14 is a block diagram depicting the modification of an image and content area of an electronic document based on cross signing.

FIG. 14 is a block diagram depicting the modification of an image and content area of an electronic document based on cross signing. In this example, a user interface 1400 displays the cross signed electronic document 1401. The signature of the cross sign, however, has been split and used to modify different electronic document parts. In this example, a portion 1404 of the content area of the electronic document has been modified to include a portion 1405 of the signature. Similarly, the image 1402 has been modified to include the remaining portion 1403 of the signature. The pixels of the image 1402 are modified to include this portion 1403 of the signature on the image. As a result, the original image is difficult to extract. Similarly, since the content area of the electronic document is similarly modified, the unaltered content area is difficult to extract. Finally, since the different portions of the signature are embedded in the content area and image, it is difficult to extract and reconstruct the signature. Making it difficult to extract the original content area, original image, and original signature protects against tampering, fraud, and accidental alterations.

Additional or alternative techniques can be used to provide assurance that a cross signed document has not been accidentally or intentionally altered. In one example, metadata is stored with each portion of a signature that allows the portions to be matched with one another. In another example, the signature and/or the image and content area portion that it overlies can be hashed to compute a value that is stored for later verification purposes. The value can be later used to verify that the cross sign has not been altered for example by recreating a new hash value and comparing it with the original, stored value.

Exemplary Computing Environment

Figure 15:
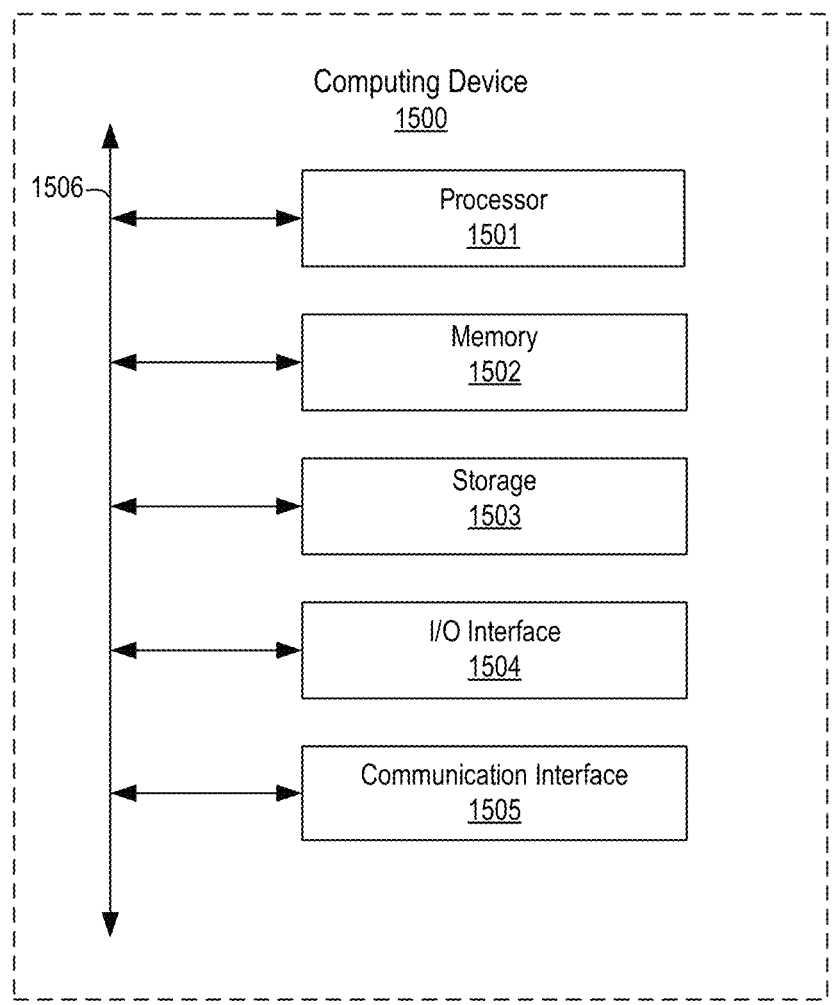
FIG. 15 is a block diagram depicting an example hardware implementation.

Any suitable computing system or group of computing systems can be used to implement the techniques and methods disclosed herein. For example, FIG. 15 is a block diagram depicting examples of implementations of such components. The computing device 1500 can include a processor 1501 that is communicatively coupled to a memory 1502 and that executes computer-executable program code and/or accesses information stored in memory 1502 or storage 1503. The processor 1501 may comprise a microprocessor, an application-specific integrated circuit ("ASIC"), a state machine, or other processing device. The processor 1501 can include one processing device or more than one processing device. Such a processor can include or may be in communication with a computer-readable medium storing instructions that, when executed by the processor 1501, cause the processor to perform the operations described herein.

The memory 1502 and storage 1503 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1500 may also comprise a number of external or internal devices such as input or output devices. For example, the computing device is shown with an input/output ("I/O") interface 1504 that can receive input from input devices or provide output to output devices. A communication interface 1505 may also be included in the computing device 1500 and can include any device or group of devices suitable for establishing a wired or wireless data connection to one or more data networks. Non-limiting examples of the communication interface 1505 include an Ethernet network adapter, a modem, and/or the like. The computing device 1500 can transmit messages as electronic or optical signals via the communication interface 1505. A bus 1506 can also be included to communicatively couple one or more components of the computing device 1500.

The computing device 1500 can execute program code that configures the processor 1501 to perform one or more of the operations described above. The program code can include one or more modules. The program code may be resident in the memory 1502, storage 1503, or any suitable computer-readable medium and may be executed by the processor 1501 or any other suitable processor. In some embodiments, modules can be resident in the memory 1502. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for storing an electronic document signed during an electronic document signing process, the method comprising:
   receiving the electronic document to be signed in the electronic document signing process, the electronic document comprising content within a content area, an image field positioned on the content area, and a cross sign field positioned partially on the image field and partially on a portion of the content area outside of the image field;
   receiving an image to populate the image field and a signature to populate the cross sign field;
   creating a first signature portion and a second signature portion by splitting the signature;
   creating a modified image by modifying the image to include the first signature portion;
   creating a modified content area by modifying the content area of the electronic document to include the second signature portion; and
   storing the electronic document by storing a file comprising separate elements, the separate elements comprising the modified content area, the modified image, and searchable text elements of the electronic document to protect the signature and the image without flattening the electronic document into a single image, wherein the separate elements are separately searchable;
   wherein splitting the signature comprises determining two or more signature portions based on an intersection of a border of the image with the signature, wherein the two or more signature portions include the first signature portion and the second signature portion, and wherein each of the two or more signature portions exclude pixels of the signature.

2. The method of claim 1, wherein the signature is not stored in the file in a single separate element.

3. The method of claim 1, wherein creating the modified image comprises replacing pixel values to replace image content with the first signature portion.

4. The method of claim 1, wherein receiving the electronic document comprises receiving a combined field in the content area, the combined field identifying positions for the image field and the cross sign field.

5. The method of claim 4, wherein receiving the combined field comprises receiving a selection of a predefined position or rotation for the cross sign field to be positioned relative to the image field in the combined field, wherein the predefined position is selected from a set of predefined positions relative to the image field.

6. The method of claim 1, wherein receiving the electronic document comprises: displaying the content area of the electronic document in a user interface; and receiving input identifying a position in the content area in the user interface for the image field.

7. The method of claim 1, wherein receiving the electronic document comprises:
   displaying the image field on the content area in a user interface;
   receiving input identifying a position on the content area in the user interface for the cross sign field; and
   receiving input rotating, scaling, or resizing the cross sign field in the user interface.

8. The method of claim 1, wherein receiving the electronic document comprises receiving application programming interface calls to position the image field or position the cross sign field.

9. A system for cross signing on an image during an electronic document signing process, the system comprising:
   an authoring means for authoring an electronic document with fields for cross signing, the electronic document to be signed by a signer in the electronic document signing process;
   a receiving means for receiving an image and a signature, wherein the signature comprises a signature image; and
   a storing means for storing the electronic document by creating a first signature portion and a second signature portion by splitting the signature and by modifying the electronic document and the image based on the first signature portion and the second signature portion to protect the signature and the image without flattening the electronic document into a single image, wherein the electronic document is searchable;
   wherein splitting the signature comprises determining two or more signature portions based on an intersection of a border of the image with the signature, wherein the two or more signature portions include the first signature portion and the second signature portion, and wherein each of the two or more signature portions exclude pixels of the signature.

10. The system of claim 9, wherein the storing means is configured to:
create a modified image by modifying the image to include the first signature portion;
create a modified content area by modifying content area of the electronic document to include the second signature portion; and
store the electronic document by storing a file comprising separate elements, the separate elements comprising the modified content area and the modified image.

11. The system of claim 10, wherein the storing means is further configured to split the signature into the first signature portion and the second signature portion based on an intersection of a border of the image with the signature.

12. The system of claim 9, wherein the authoring means is configured to position an image field and a cross sign field within a content area of the electronic document, wherein the cross sign field is positioned partially on the image field and partially on a portion of the content area outside of the image field.

13. The system of claim 12, wherein the authoring means is configured to position a combined field that comprises the image field and the cross sign field.

14. The system of claim 13, wherein the authoring means is configured to position the cross sign field in a predefined position relative to the image field in the combined field.

15. The system of claim 12, wherein the authoring means is configured to independently position the image field and the cross sign field.

16. The system of claim 9, wherein the authoring mean is configured to position the fields based on application programming interface calls.

17. A non-transitory computer-readable medium storing instructions, the instructions comprising instructions for:
receiving an electronic document to be signed in an electronic document signing process, the electronic document comprising content within a content area;
receiving a signature and an image for inclusion in the electronic document;
creating a first signature portion and a second signature portion by splitting the signature;
creating a modified image by modifying the image to include the first signature portion;
creating a modified content area by modifying the content area of the electronic document to include the second signature portion; and
storing the electronic document by storing a file comprising separate elements, the separate elements comprising the modified content areaand the modified image to protect the signature and the image without flattening the electronic document into a single image, wherein the separate elements are separately searchable, wherein the electronic document is configured to enable searching for text in at least one searchable text element among the separate elements;
wherein splitting the signature comprises determining two or more signature portions based on an intersection of a border of the image with the signature, wherein the two or more signature portions include the first signature portion and the second signature portion, and wherein each of the two or more signature portions exclude pixels of the signature.

18. The computer readable medium of claim 17, wherein the separate elements further comprise searchable text and wherein the signature is not separately stored in the file.

19. The computer readable medium of claim 17, wherein creating the modified image comprises replacing pixel values to replace image content with the first signature portion.

* * * * *